United States Patent
Marcy et al.

(10) Patent No.: US 8,176,413 B2
(45) Date of Patent: *May 8, 2012

(54) METHOD AND APPARATUS FOR PROCESSING A PARSEABLE DOCUMENT

(75) Inventors: Glenn A. Marcy, Dublin, OH (US); Jan Van Lunteren, Gattikon (CH); Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/059,913

(22) Filed: Mar. 31, 2008

(65) Prior Publication Data

US 2008/0184105 A1   Jul. 31, 2008

Related U.S. Application Data

(63) Continuation of application No. 11/140,189, filed on May 27, 2005, now Pat. No. 7,562,293.

(51) Int. Cl.
*G06F 17/27* (2006.01)
*G06F 11/00* (2006.01)

(52) U.S. Cl. ........ 715/237; 715/234; 715/239; 715/248; 715/249; 726/22; 726/24

(58) Field of Classification Search ............... 715/234, 715/237, 239, 248, 249, 255, 256; 726/23, 726/24
See application file for complete search history.

(56) References Cited

U.S. PATENT DOCUMENTS

| | | | | |
|---|---|---|---|---|
| 6,697,950 | B1 * | 2/2004 | Ko | 726/24 |
| 7,318,221 | B2 * | 1/2008 | Lin | 717/143 |
| 7,487,544 | B2 * | 2/2009 | Schultz et al. | 726/24 |
| 2002/0091818 | A1 * | 7/2002 | Cascio et al. | 709/224 |
| 2003/0088680 | A1 * | 5/2003 | Nachenberg et al. | 709/229 |
| 2003/0120947 | A1 * | 6/2003 | Moore et al. | 713/200 |
| 2003/0196104 | A1 * | 10/2003 | Baber et al. | 713/200 |
| 2004/0044952 | A1 * | 3/2004 | Jiang et al. | 715/500 |
| 2004/0073870 | A1 * | 4/2004 | Fuh et al. | 715/513 |
| 2004/0093513 | A1 * | 5/2004 | Cantrell et al. | 713/201 |
| 2005/0034032 | A1 * | 2/2005 | Uchida | 714/48 |
| 2005/0198692 | A1 * | 9/2005 | Zurko et al. | 726/24 |
| 2005/0234856 | A1 * | 10/2005 | Baumhof | 707/1 |
| 2005/0240999 | A1 * | 10/2005 | Rubin et al. | 726/22 |
| 2006/0123244 | A1 * | 6/2006 | Gheorghescu et al. | 713/188 |
| 2006/0236392 | A1 * | 10/2006 | Thomas et al. | 726/23 |
| 2006/0242709 | A1 * | 10/2006 | Seinfeld et al. | 726/24 |
| 2007/0124362 | A1 * | 5/2007 | Kren | 709/202 |

* cited by examiner

*Primary Examiner* — Chau Nguyen
(74) *Attorney, Agent, or Firm* — McGinn Intellectual Property Law Group, PLLC

(57) ABSTRACT

A data processing method comprises receiving an electronically parseable document, scanning the document according to at least one predefined rule to determine if the document is suspicious, and, if the document is determined not to be suspicious, parsing the document with a first parser, and, if the document is determined to be suspicious, parsing the document with a second parser.

19 Claims, 2 Drawing Sheets

METHOD AND APPARATUS FOR PROCESSING A PARSEABLE DOCUMENT

RELATED APPLICATIONS

This application is a Continuation Application of U.S. patent application Ser. No. 11/140,189, filed on May 27, 2005 now U.S. Pat. No. 7,562,293, which is incorporated herein by reference.

This invention relates to a data processing method and apparatus for processing an electronically parseable document.

In data networks, such as the Internet, it is common practice to transfer information in the form of documents. For example, a web page produced in HTML (Hypertext Markup Language) is a document that is received by a computer and rendered by a browser. HTML is a document description language, which defines the use of tags in documents for such things as formatting and linking to other documents. Likewise, XML is a document description language, which allows the creation of new tags, unlike HTML, where the set of tags is standardised.

When a computer receives a document in HTML or XML, the document is processed by a parser. The document is parsed by an algorithm or program to determine the syntactic structure of the document. This occurs as part of the process of rendering the document for use by the receiving computer. The parsing also determines if the original document is compliant with the syntax rules requirements of the relevant language. For example, within an XML document, it is a requirement that a tag that is used to open an element, for example <name> be followed (eventually) by a closing tag, in this example, </name>. If the opening tag is never followed by a closing tag then the document is considered invalid. An invalid document will be rejected by the parser. A very large amount of information concerning XML is in the public domain, but for further detail numerous documents concerning XML are available at www.ibm.com/developerworks.

It is however possible to have a valid document that is nevertheless problematic for the receiving computer. In particular, certain documents can be considered to be "malicious", in the sense that they are designed to be valid but also have properties that can cause the receiving computer or program to fail. Such malicious documents can be created by accident, following failures in the original document creation process, or can be created deliberately with the intent to attack, disable or interfere with a computing system.

For example, an XML document with several thousand start tags, each ultimately with corresponding end tags, will not be rejected by a parser as being invalid, but in many computing environments such a document will cause the parser to fail, as it is likely that the parser will not have sufficient allocated resources, to deal with such a heavy processing requirement. For example, a parser will keep track of those elements that have been opened in order to check that they have been subsequently closed. A finite amount of memory will be allocated to the parser for this task. Similarly, the processing of the malicious document by the parser may take such a long period of time that the efficiency of the receiving system is compromised. This will particularly be the case if in the form of a pseudo denial of service attack multiple malicious documents are sent to a system that will channel them through a single parser.

It is therefore an object of the invention to improve upon the known art. According to a first aspect of the present invention, there is provided a data processing method comprising receiving an electronically parseable document, scanning the document according to at least one predefined rule to determine if the document is suspicious, and, if the document is determined not to be suspicious, parsing the document with a first parser, and, if the document is determined to be suspicious, parsing the document with a second parser.

According to a second aspect of the present invention, there is provided a data processing apparatus comprising a scanner for receiving an electronically parseable document, and for scanning the document according to at least one predefined rule to determine if the document is suspicious, a first parser for parsing the document if the document is determined not to be suspicious, and a second parser for parsing the document if the document is determined to be suspicious.

According to a third aspect of the present invention, there is provided a computer program product on a computer readable medium for controlling data processing apparatus, the computer program product comprising instructions for receiving an electronically parseable document, scanning the document according to at least one predefined rule to determine if the document is suspicious, and, if the document is determined not to be suspicious, parsing the document with a first parser, and, if the document is determined to be suspicious, parsing the document with a second parser.

Owing to the invention, it is possible to provide a system that uses a scanner to decide between a robust parser and a fast parser to process the received documents. Thereby malicious or resource-intensive documents are filtered and the likelihood of system overload due to the receipt and parsing of malicious documents is reduced. The scanner operates according to one or more predefined rules to identify a suspicious document, and so-identified documents are sent to the robust parser for processing, whereas those deemed non-suspicious are sent to a normal parser, also referred to as fast parser.

In this context, a fast parser is understood as a parser that is faster than the robust parser. The fast parser has access to more resources than the robust parser. On the other hand, in this context, a robust parser is understood as a parser that is slower than the fast parser. The robust parser operates in a more resource-constrained environment than the fast parser.

The invention provides an improved method for detecting and filtering malicious documents, particularly XML documents. The invention involves a method for detecting, filtering and processing malicious documents. In this disclosure, the term malicious is used to denote documents that in some way, such as on purpose or by accident, can harm the operation of a computer system and/or applications, e.g., web services.

One example of the intentional use of malicious XML documents is an XML denial of service attack, which intends to overload a system by sending XML documents that will exhaust certain resources, for example processor and/or memory, in order to bring the whole system down.

Because malicious XML documents can and typically will be perfectly well-formed XML documents, they cannot always be detected to be malicious by a standard parser operation. Instead, special processing involving additional analysis of the document can serve to determine if a document is malicious. Consequently, if these additional processing steps are integrated within a "conventional" software based parser, this could significantly impact performance, which is already very critical.

The principle of the improved method and apparatus involves two aspects. The first aspect is to scan the document, preferably using a hardware-based engine, and check the document against one or more rules which will indicate if the document is suspected to be suspicious. These rules can be dynamically updated, e.g. based on some protocol, in order to react more quickly to new kinds of malicious XML and/or XML denial of service attacks, in a similar way to the updating of virus scanners.

The second aspect is to implement two kinds of parsers. These can be two different parser implementations or one parser with two modes of operation. In the latter case, it is possible that one mode of operation involves a more restricted task priority and more limited access to processing resources, in comparison to the other mode. Documents that are determined to be non-suspicious by the scanner are sent to the first parser, which is faster, i.e. designed for high-performance processing and does not need to implement protection mechanisms against a malicious document.

Advantageously, the first parser is a fast parser and the second parser is a robust parser. The first parser, which will in an average computing environment more likely parse the majority of documents being handled by the system, will have an emphasis on speed of processing, in order to handle multiple documents in a shorter time. The second parser however, which handles those documents deemed to be suspicious, has an emphasis on robustness. Robustness may entail that the second parser has access to more limited resources, such that the exhaustion of those resources during parsing will rather bring the parsing per se to a stop than deteriorate the performance of the whole system. At the same time the robust parser may use additional checks to obtain information about the parsed document. This will result in a slower parsing of documents, as the additional checks are carried out during the parsing.

Preferably, the processing method further comprises, while scanning the document, converting the document from a first format to a second format. The scanner within the system, which checks the document to see if it is suspicious, and routes it accordingly, can also carry out pre-processing on the document. This pre-processing can take a number of different forms, and can be a combination of adaptations of the original document. The scanning operation can perform some part of the parsing, and/or can convert the document into a format that will make the subsequent parsing easier for the parser.

In a preferred embodiment the method further comprises monitoring the performance of the first parser, and adjusting one or more predefined rules and/or creating a new rule in dependence on the result of the monitoring. An example here for can be that a rule is used that in the monitoring proves to be inefficient because its application always leads to the same result. Such rule may simply be removed or replaced by a rule that is more differentiative. Also, if the first parser receives multiple documents that during its parsing appear as malicious, and hence should rather have been parsed by the second parser, a rule of the scanner might be changed to from then on filter out documents with a comparable setting to those malicious documents, and route those to the second parser. The first parser is parsing those documents that are considered to be non-suspicious. The performance of this parser, in a preferred embodiment, is monitored to detect any document that appears, on the basis of the performance of the first parser, to be malicious. Such a document would not have been spotted by the rules used by the scanner.

In other words, to improve the performance of the system, rules can be either amended, or new rules can be created, to ensure that further documents of a similar type are detected by the scanner. A rules may have a threshold within it, and the dynamic adjustment of this threshold in dependence on the monitoring will increase the robustness of the overall system. The monitoring of the parser can monitor such things as the memory consumption and/or processing time for a document.

Advantageously, the method further comprises monitoring the performance of the second parser, and in predefined circumstances, discarding a document prior to parsing, if said document is of a particular form. The second parser, which deals with those documents that are considered to be suspicious, may register that a particular document is being repeatedly processed by the scanner. In these circumstances, it is advantageous to notify the scanner of the form of the particular repeated document, and for the scanner to subsequently discard any further documents of that form, without passing the document for parsing. Processing and memory resources are saved as a result. The respective document may also instead of being discarded, be saved and further processed for analyzing its source, and maybe refining a rule of the scanner. Also such document may be routed to a third parser. Such third parser may be a separate robust parser that has a computing environment that is decoupled from the second parser.

Embodiments of the present invention will now be described, by way of example only, with reference to the accompanying drawings, in which.

Figure 1:
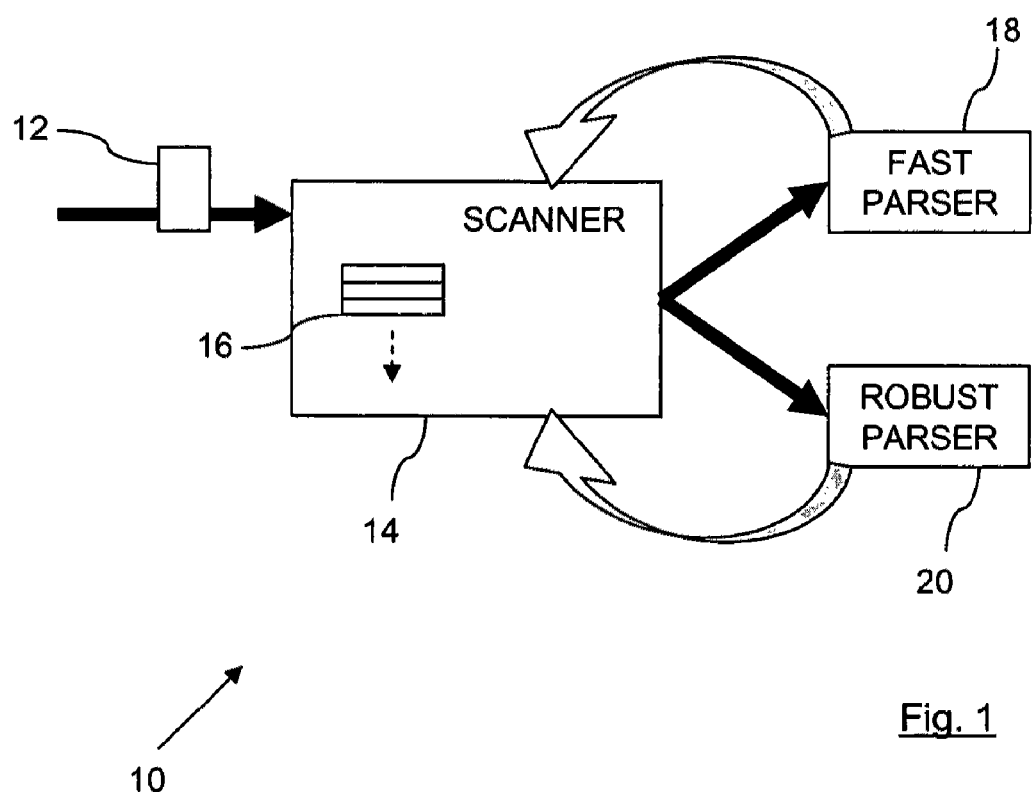
FIG. 1 is a schematic diagram of apparatus for processing a document.

In FIG. 1, apparatus 10 for processing a document 12 is shown. The apparatus 10 can form part of a computer system such as a personal computer. The document 12 comprises a parseable document 12 such as an XML document 12 being received by the computer system via an external network. Such a network would be, for example, the Internet, where the transfer of documents, particularly in the XML format, occurs, e.g. many thousands of times a second worldwide.

The apparatus 10 includes a scanner 14 for receiving the document 12. The scanner 14 is in a preferred embodiment implemented in hardware and is designed for scanning the document 12 to determine if the document 12 is suspicious. A suspicious document is a document that potentially will have a deleterious effect on the receiving system, when it is processed. Such document can also be a well-formed document within the rules, e.g. the XML specification, under which such document is created, but when processed by parsing, will be structured in such a way as to cause the receiving system to fail or to slow down considerably.

The scanner 14 can be implemented, for example, as a B-FSM engine. Such a device is described in detail in the following reference, J. van Lunteren, A. P. J. Engbersen, J. Bostian, B. Carey, and C. Larsson, "XML accelerator engine," First International Workshop on High Performance XML Processing, in conjunction with the 13th International World Wide Web Conference (WWW2004), New York, N.Y., USA, May 2004.

The scanner 14 bases the scan of the document 12 on a stored set of predefined rules 16 comprising one or more rules. These rules can be dynamic and can be changed and added to as the scanner 14 is working. This is discussed in more detail below. The rules 16 that the scanner 14 will apply to carry out a scan on the received document 12 can be relatively simple and for instance relate to counting document components, such as attributes and elements, or can be more complicated rules that are checking for the existence of a predetermined pattern within the structure of the received document 12. A rule could also combine the analysis of the document content with information about the source of the document, or other technical parameters associated with the document reception, such as time of receipt, or whether the document resembles or is identical to another document received, whether the document comes from the same source as another document, etc. A rule could be that a document that comes from a source from which came another document that previously had been identified as suspicious, is also marked as suspicious.

A number of different aspects of the received document 12 can be checked by the scanner 14 under the operation of the rules 16. There follows a list of several known malicious mechanisms and how these can be detected by the scanner 14. If there is a likelihood that a document is malicious, then it is considered to be suspicious, and the subsequent handling of this document is changed to reflect this detected status.

Possible malicious features include;
- very long element and attribute names—these can be detected by implementing a warning threshold on name size
- very large number of attributes per element (uses extensive processing power and memory to check for unique attribute names)—detected by implementing a "warning" threshold on number of attributes per element
- very large number of nested elements (uses extensive amount of memory to store all unmatched start tags in order to check they are well-formed)—detected by implementing a 'warning threshold' on element nesting depth All aforelisted parameters can be checked by applying thresholds, e.g. giving a length threshold for an attribute name, such that any attribute name exceeding the threshold will be understood as "very long", and hence identified as a malicious feature. Similar thresholds can be implemented for the other listed properties such as for size, length, number, time.

Once the scan of the document 12 has been executed, the document 12 is passed to a first parser 18 for parsing the document 12 if the document 12 is determined not to be suspicious, or to a second parser 20 for parsing the document 12 if the document 12 is determined to be suspicious. The first parser 18 is a fast parser 18 and the second parser 20 is a robust parser 20. Thus those documents that are suspected to be malicious are sent to the second parser 20, which implements a protection mechanism or is executed in a more restricted environment with more limited access to computer resources, e.g., processor cycles, memory. This robust parser 20 will proceed with the parsing of the document 12 with one or more specific checks in place to try to ensure that a system failure does not occur and/or that the parsing by the robust parser 20 is terminated under predetermined circumstances.

The robust parser 20 will include one or several mechanisms that will prevent it from using undesirably high amounts of computing resources during the parsing of suspicious documents, which could otherwise create the risk of bringing the entire system down, which is the objective of a denial of service attack, including the processing of non-malicious documents. Therefore the maximum amount of computing resource that is available to the robust parser 20 is predefined, and the resource consumption is not allowed to exceed this maximum amount.

The two main computing resources that can preferably be controlled for this purpose are processor (cpu) time and (main) memory usage. The consumption of processor time for executing a task that is part of a robust parser application can be limited through the task scheduler that is part of the operating system, for example, by assigning the task a lower priority than other tasks or by limiting the percentage of time the task is allowed to execute during given time frames. As a result, the total time that it will take to perform the robust parsing operation will be longer compared to the fast parser which will have a less constrained access to processor time. However, the risk of the system being brought down due to an overload of the processor caused by the processing of a malicious document has been reduced or practically been eliminated.

The above mechanism allows the constraint of the relative amount of processor time that will be assigned to the robust parser 20 during a given time period. In addition, the total amount of actual processor time that will be consumed by the robust parser 20 for parsing an entire suspicious document can be constrained in order to prevent the parsing operation from lasting a longer amount of time, which would cause a backlog in the processing of other suspicious documents that have been detected by the scanner 14. This constraint can also be made dependent on the size of the suspicious document, for example, by limiting overall processing rate of the suspicious document, expressed by the average number of bytes that are processed per unit time. Functionality to check for the latter type of constraints can be implemented by the robust parser 20. If a suspicious document would violate these constraints, for example, when the actual total processing time exceeds a threshold, the document 12 can be dropped or written to a special storage which will store suspicious documents for future analysis, either manual or automatic.

The amount of main memory that is available to a task can be controlled by the operating system (memory manager). If a task would use a too high amount of main memory, then the overall system performance might be reduced, because too much data would be swapped between the main memory and the slower hard-disk based storage, which typically forms the next layer within the memory hierarchy. In order to prevent the parsing of a malicious document to cause this situation, the operating system can limit the access of the robust parser 20 to a predetermined amount of main memory, and swap the data related to that parsing task on the hard-disk if the limit is reached. In this way, the performance penalty caused by the lower performance of the hard-disk, will only be experienced by the robust parser 20, and cannot cause an overall system performance degradation that would also impact the parsing of non-suspicious documents by the fast parser 18. Furthermore, an additional threshold can be put on the total amount of memory that a robust parser 20 is allowed to request, and if this threshold is reached, the processing of the suspicious document can be stopped similar as when it would reach a limit for total processing time as described above.

In addition to the above mechanism, other techniques exist that can be applied by persons skilled in the art for limiting the access of a robust parser application to critical processing resources, such as processor time and memory but also other resources such as I/O. These techniques can hence be used in the herein context to prevent the processing of a malicious document by the robust parser 20 from bringing the system operation down.

Figure 2:
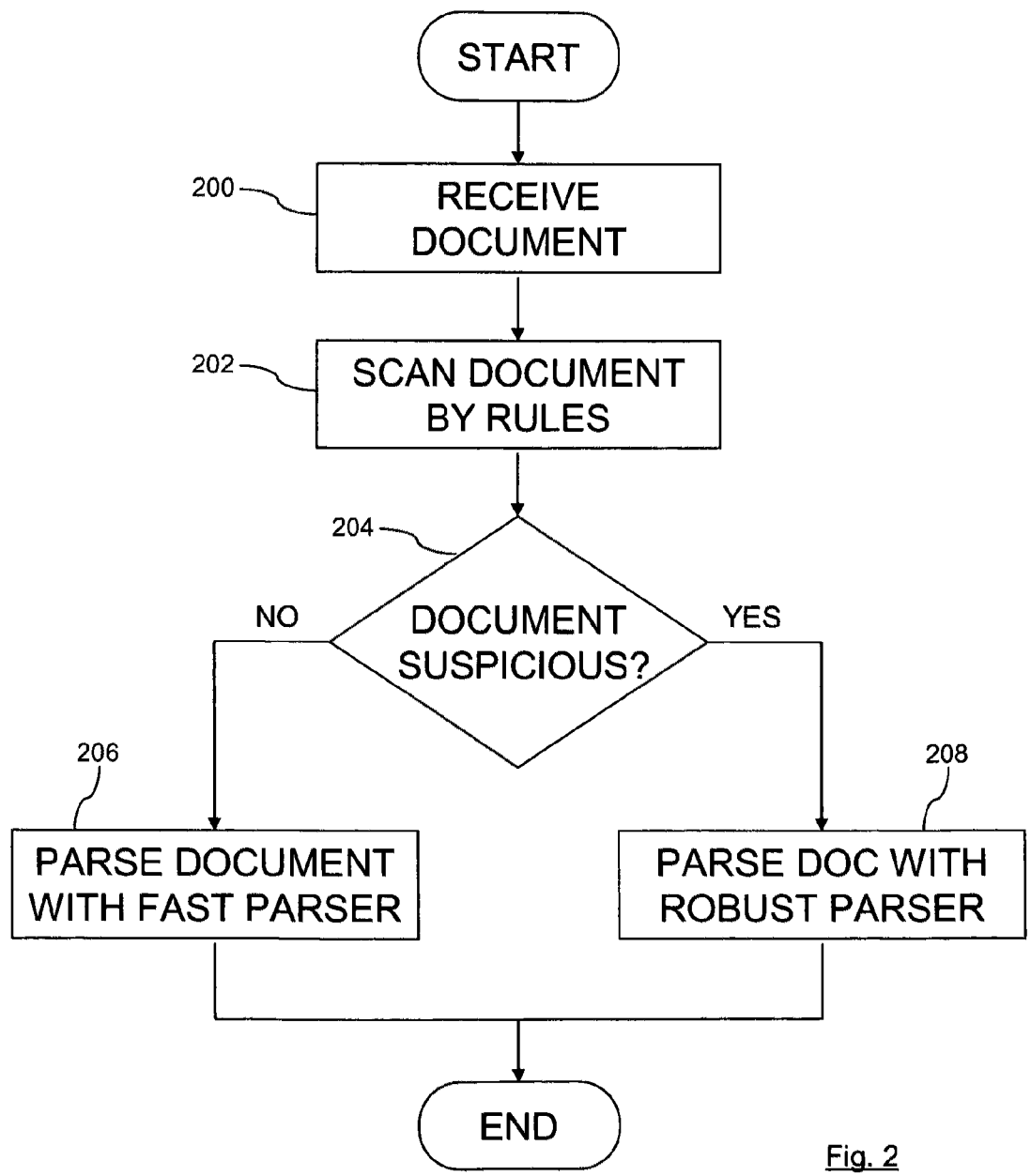
FIG. 2 is a flowchart of a method for processing a document.

FIG. 2 summarises the method of operation of the apparatus 10 of FIG. 1. The method for processing the document 12 comprises receiving (step 200) the document 12, and scanning (step 202) the document 12 according the predefined rule 16 to determine if the document 12 is suspicious. Depending upon the result of the scan of the document 12, at step 204, the document 12 is routed to one of two parsers 18 and 20, wherein the second parser 20 may be the same parser as the first parser 18, the two parsers simply running different modes of operation, e.g. by being subjected to a different parameter setting. The parsers 18, 20 can also be two independent parsers, preferably able to run in parallel.

The two steps 206 and 208 are alternatives, wherein, if the document is determined not to be suspicious, the step 206 of parsing the document with the first parser 18 is executed, or, if the document is determined to be suspicious, then step 208 of parsing the document with the second parser 20 is carried out. The method supports a higher overall performance in combination with an increased robustness and security.

The method can further comprise the step of, while scanning the document 12, converting the document 12 from a first format to a second format. This function can be carried out by the scanner 14, while it is scanning the document 12 according to the rule 16. In addition to the scanning operation, to determine whether the document 12 is suspicious or not suspicious, the scanner unit 14 can also perform some part of the parsing, and/or convert the XML document into a format that would make parsing easier for the parsers, for example by converting a UTF-8 encoded document—which involves a variable number of bytes per character—into a UTF-32 encoded document—which involves a fixed number of bytes per character. In this case the scanner 14 becomes a combined scanner and preprocessing unit. The scanner can apply one or more rules to differentiate between a suspicious document and a non suspicious document. In a preferred embodiment, the rules are completed over time by adding new rules that have been learned. Such learning could come from monitoring the parser operation of any of the parsers. The learning could also be induced from outside data, e.g. coming from a website specialized in creating new rules based on input from developers or users.

In a preferred embodiment the scanner could also perform part of the parsing. The part of parsing can be selected such that this part is not or only to a lower degree putting the system comprising the scanner at risk to be compromised by the document itself. So this parsing should preferably include the parsing of parameters of the document that are below a predetermined threshold of probability to be misused by malicious documents for degrading system performance.

The apparatus 10 can also include a feedback function, illustrated by the curved arrows back from the parsers 18 and 20 to the scanner 14, in FIG. 1. The apparatus 10 can, in the first instance, monitor the performance of the first parser 18, and adjust one or more of the predefined rules 16 and/or create a new rule accordingly. This gives the apparatus 10 the ability to defend against new attacks by "learning" new malicious mechanisms that were not foreseen and/or not detected by the scanner 16. Malicious documents that have passed the tests imposed by the scanner without being detected, may have the effect of overloading the system by exhausting its resources. If this situation is detected by observing the memory consumption and/or processing time used for that document, then automatic feedback can be provided to the scanner 14 which can adapt one or more predetermined detection thresholds based on that feedback in combination with the characteristics of the document that passed the scan undetected.

Likewise, the apparatus 10 can also monitor the performance of the second parser 20, and in predefined circumstances, arrange for a specific handling, like the discarding of a document prior to parsing, if the document is of a particular form. This provides a method for the detection and response to a denial of service attack. For example, if several documents have been received that were malicious, then it is possible to identify subsequent documents of the same type without parsing them, e.g. by looking at the source address, message size, or other, and filtering these without spending resources on parsing them.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, computer-readable medium, or tangible computer-readable storage medium encoded with a computer program, which comprises all the features enabling the implementation of the methods described herein, and which when loaded in a computer system—is able to carry out these methods.

Computer program element or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A data processing method, comprising:
receiving an electronically parseable document; and
scanning the document according to at least one predefined rule to determine if the document is suspicious,
wherein if the document is determined not to be suspicious, passing the document from a scanner to a first parser, and parsing the document with the first parser, and
wherein if the document is determined to be suspicious, passing the document from the scanner to a second parser without passing the document from the scanner to the first parser, and parsing the document with the second parser,
wherein the document is determined to be suspicious if the document includes a property that may cause a receiving computer system to fail,
wherein the document is determined to be suspicious if the document comprises a well-formed document within a plurality of rules, but when the document is parsed, the document fails or slows down the receiving computer system to fail, and
wherein the property includes at least one of a length of an attribute name, a number of an attribute per element, and a number of nested elements that exceeds a predetermined threshold.

2. The method according to claim 1, wherein the first parser is faster than the second parser.

3. The method according to claim 1, further comprising, while scanning the document, converting the document from a first format to a second format.

4. The method according to claim 1, further comprising monitoring a performance of the first parser, and adjusting at least one of said at least one predefined rule in dependence on the monitoring.

5. The method according to claim 1, further comprising monitoring a performance of the first parser, and creating a new rule in dependence on the monitoring.

6. The method according to claim 1, further comprising monitoring a performance of the second parser, and in a predefined circumstance, discarding another document prior to parsing, if said document is of a particular form.

7. A data processing apparatus, comprising:
a scanner for receiving an electronically parseable document, and for scanning the document according to at least one predefined rule to determine if the document is suspicious;
a first parser for parsing the document if the document is determined not to be suspicious; and
a second parser for parsing the document if the document is determined to be suspicious, wherein the scanner is adapted to determine if the document is suspicious before passing the document to one of the first parser or the second parser, wherein if the document is determined to be suspicious, the document is passed from the scanner to the second parser without first passing the document from the scanner to the first parser, wherein the document is determined to be suspicious if the document includes a property that may cause a receiving computer system to fail, wherein the document is determined to be suspicious if the document comprises a well-formed document within a plurality of rules, but when the document is parsed, the document fails or slows down the receiving computer system to fail, and wherein the property includes at least one of a length of an attribute name, a number of an attribute per element, and a number of nested elements that exceeds a predetermined threshold.

8. The apparatus according to claim 7, wherein the first parser is faster than the second parser, and wherein the second parser is adapted to send the document that has been determined to be suspicious to a storage, if a parsing of the document is determined to exceed a predetermined constraint comprising one of a processing time, and a predetermined memory usage value.

9. The apparatus according to claim 7, wherein the scanner is arranged, while scanning the document, to convert the document from a first format to a second format.

10. The apparatus according to claim 7, the apparatus being designed to monitor the performance of the first parser and to adjust at least one of said at least one predefined rule in dependence on the monitoring.

11. The apparatus according to claim 7, being designed to monitor a performance of the first parser and to create a new rule in dependence on the monitoring.

12. The apparatus according to claim 7, the apparatus being designed to monitor a performance of the second parser and in a predefined circumstance, to discard said document prior to parsing, if said document is of a particular form.

13. A tangible computer-readable storage non-transitory medium encoded with a computer program which, when loaded in a processor, configures said processor to perform a method, said method comprising:

receiving an electronically parseable document; and scanning the document according to at least one predefined rule to determine if the document is suspicious, wherein if the document is determined not to be suspicious, passing the document from a scanner to a first parser, and parsing the document with the first parser, wherein if the document is determined to be suspicious, passing the document from the scanner to a second parser, and parsing the document with the second parser without passing the document from the scanner to the first parser, wherein the document is determined to be suspicious if the document includes a property that may cause a receiving computer system to fail, wherein the document is determined to be suspicious if the document comprises a well-formed document within a plurality of rules, but when the document is parsed, the document fails or slows down the receiving computer system to fail, and wherein the property includes at least one of a length of an attribute name, a number of an attribute per element, and a number of nested elements that exceeds a predetermined threshold.

14. The computer-readable storage non-transitory medium encoded with the computer program according to claim 13, further comprising preventing a computer from failing as a result of processing a suspicious document, when the computer program is loaded in the processor.

15. The computer-readable storage non-transitory medium encoded with the computer program according to claim 13, wherein the first parser is faster than the second parser.

16. The computer-readable storage non-transitory medium encoded with the computer program according to claim 13, wherein said method further comprises, while scanning the document, converting the document from a first format to a second format.

17. The computer-readable storage non-transitory medium encoded with the computer program according to claim 13, wherein said method further comprises monitoring a performance of the first parser, and adjusting at least one of said at least one predefined rule in dependence on the monitoring.

18. The computer-readable storage non-transitory medium encoded with the computer program according to claim 13, wherein said method further comprises monitoring a performance of the first parser, and creating a new rule in dependence on the monitoring.

19. The computer-readable storage non-transitory medium encoded with the computer program according to claim 13, wherein said method further comprises monitoring a performance of the second parser, and in a predefined circumstance, discarding another document prior to parsing, if said document is of a particular form.

* * * * *